United States Patent
Lee et al.

(10) Patent No.: US 12,287,981 B2
(45) Date of Patent: Apr. 29, 2025

(54) ELECTRONIC DEVICE AND STORAGE MANAGEMENT METHOD USING SAME

(71) Applicant: SAMSUNG ELECTRONICS CO., LTD., Suwon-si (KR)

(72) Inventors: Woojoong Lee, Suwon-si (KR); Hyeongjun Kim, Suwon-si (KR); Sungjong Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/128,620

(22) Filed: Mar. 30, 2023

(65) Prior Publication Data

US 2023/0244406 A1 Aug. 3, 2023

Related U.S. Application Data

(63) Continuation of application No. PCT/KR2021/014875, filed on Oct. 22, 2021.

(30) Foreign Application Priority Data

Nov. 4, 2020 (KR) .......................... 10-2020-0146350

(51) Int. Cl.
*G06F 3/06* (2006.01)
(52) U.S. Cl.
CPC .......... *G06F 3/0652* (2013.01); *G06F 3/0611* (2013.01); *G06F 3/0679* (2013.01)
(58) Field of Classification Search
CPC ..... G06F 3/0652; G06F 3/0611; G06F 3/0679
See application file for complete search history.

(56) References Cited

U.S. PATENT DOCUMENTS 9,304,905 B2 4/2016 Kwon et al.
10,013,354 B2 7/2018 Flynn et al.
(Continued)

FOREIGN PATENT DOCUMENTS

CN 110554999 A 12/2019
KR 10-2010-0054402 A 5/2010
(Continued)

OTHER PUBLICATIONS

International Search Report (PCT/ISA/210) issued by the International Searching Authority on Jan. 20, 2022 in International Application No. PCT/KR2021/014875.
(Continued)

*Primary Examiner* — Kannan Shanmugasundaram
(74) *Attorney, Agent, or Firm* — Sughrue Mion, PLLC (57) ABSTRACT

An electronic device includes: a memory including a storage; and a processor operatively connected to the memory, wherein the processor is configured to: based on a request to delete a file, identify use attribute information about the file requested to be deleted; based on information related to an extension of the file requested to be deleted that being stored in the memory, update the information related to the extension of the file requested to be deleted, based on the use attribute information; and configure an attribute of the extension of the file requested to be deleted, based on the updated information related to the extension of the file requested to be deleted and a hotness condition of the storage.

16 Claims, 7 Drawing Sheets

(56) References Cited

U.S. PATENT DOCUMENTS

| | | |
|---|---|---|
| 10,282,324 B2 | 5/2019 | Bhimani et al. |
| 11,106,630 B2 | 8/2021 | Park et al. |
| 2010/0125697 A1 | 5/2010 | Lee et al. |
| 2014/0013032 A1 | 1/2014 | Min et al. |
| 2014/0289492 A1 | 9/2014 | Ranjith Reddy et al. |
| 2016/0062660 A1 | 3/2016 | Kunimatsu et al. |
| 2017/0017663 A1* | 1/2017 | Huo .................... G06F 16/2365 |
| 2017/0031631 A1 | 2/2017 | Lee et al. |
| 2017/0075832 A1 | 3/2017 | Bhimani et al. |
| 2017/0228157 A1 | 8/2017 | Yang et al. |
| 2017/0285971 A1* | 10/2017 | Dai ....................... G06F 3/0653 |
| 2018/0121351 A1 | 5/2018 | Zhang et al. |
| 2018/0276232 A1* | 9/2018 | Dhanasekaran ........ G06F 16/25 |
| 2018/0373600 A1 | 12/2018 | Xu et al. |
| 2019/0034120 A1 | 1/2019 | Barczak et al. |
| 2021/0337019 A1 | 10/2021 | Zhang |

FOREIGN PATENT DOCUMENTS

| | | |
|---|---|---|
| KR | 10-2013-0028517 A | 3/2013 |
| KR | 10-2014-0006299 A | 1/2014 |
| KR | 10-2014-0114618 A | 9/2014 |
| KR | 10-2017-0008153 A | 1/2017 |
| KR | 10-2018-0012061 A | 2/2018 |
| KR | 10-2018-0017148 A | 2/2018 |
| KR | 10-2018-0021319 A | 3/2018 |
| KR | 10-2018-0113739 A | 10/2018 |
| KR | 10-1681401 B1 | 11/2018 |

OTHER PUBLICATIONS

Written Opinion (PCT/ISA/237) issued by the International Searching Authority on Jan. 20, 2022 in International Application No. PCT/KR2021/014875.

Communication dated Jan. 17, 2024, issued by European Patent Office in European Patent Application No. 21889438.4.

* cited by examiner

FIG. 7

ELECTRONIC DEVICE AND STORAGE MANAGEMENT METHOD USING SAME

CROSS-REFERENCE TO RELATED APPLICATIONS

This application is a by-pass continuation application of International Application No. PCT/KR2021/014875, filed on Oct. 22, 2021, which is based on and claims priority to Korean Patent Application No. 10-2020-0146350, filed on Nov. 4, 2020 in the Korean Intellectual Property Office, the disclosures of which are incorporated by reference herein their entireties.

BACKGROUND

1. Field

The disclosure relates to an electronic device and a storage management method using the same.

2. Description of Related Art

An electronic device may have a separate storage to store a large amount of data. The storage may include a flash memory. The flash memory may perform a delete operation before performing a write operation due to physical characteristics of the flash memory. For example, since valid pages and invalid pages are distributed in a plurality of blocks due to characteristics of the flash memory, a garbage collection operation may be performed to delete the previous block after copying the valid pages to a new block.

In general, when a file write request (a request to write a file) is generated in a file system, an electronic device may transmit the file write request to the storage by tagging predefined hotness information to the extension of a file. However, as the hotness information is configured in consideration of only the extension of the file, the accuracy of the hotness information for the extension of the file may decrease.

SUMMARY

According to an aspect of the disclosure, an electronic device includes: a memory including a storage; and a processor operatively connected to the memory, wherein the processor is configured to: based on a request to delete a file, identify use attribute information about the file requested to be deleted; based on information related to an extension of the file requested to be deleted that being stored in the memory, update the information related to the extension of the file requested to be deleted, based on the use attribute information; and configure an attribute of the extension of the file requested to be deleted, based on the updated information related to the extension of the file requested to be deleted and a hotness condition of the storage.

The hotness condition may be received from the storage based on an input requesting the hotness condition transmitted to the storage.

The hotness condition may include at least one of a capacity-based hotness condition or a time-based hotness condition, the capacity-based hotness condition may include a sum of write capacities of data blocks after a data block of a specific file is stored in the storage and before being deleted, and the time-based hotness condition may include a time at which the specific file written to the data block of the specific file is deleted.

The use attribute information of the file requested to be deleted may include a deletion time of the file requested to be deleted, obtained based on a time that the file requested to be deleted is generated in the storage and a time requested to be deleted, or write capacity of the file requested to be deleted in the storage.

The attribute of the extension may include a hot file and a cold file, and the processor may be further configured to store another file having the same attribute of the extension in a same block of the storage based on the attribute of the extension.

The information related to the extension may be stored as a database, and the information related to the extension may include at least one of an extension field, an average deletion time field indicating an average time deleted from the storage for each extension, an input sample number field indicating an access frequency for an input/output request for each extension, or an attribute field of the extension.

The processor may be further configured to: count and update a number of times by which a request to delete the file is generated as a number of input samples; and based on the updated number of input samples exceeding a designated value, configure the attribute of the extension of the file requested to be deleted, based on the updated information related to the extension and the hotness condition of the storage.

The processor may be further configured to, based on a request to write another file, identify an attribute of the extension of the other file requested to be written, and tag the attribute of the extension to the other file requested to be written to transmit the other file to the storage.

According to an aspect of the disclosure, a method for storage management of an electronic device including a memory that includes a storage, includes: based on a request to delete a file, identifying use attribute information about the file requested to be deleted; based on information related to an extension of the file requested to be deleted being stored in the memory, updating the information related to the extension of the file requested to be deleted, based on the use attribute information; and configuring an attribute of the extension of the file requested to be deleted, based on the updated information related to the extension and a hotness condition of the storage.

The method may further include: transmitting an input requesting the hotness condition to the storage; and receiving the hotness condition from the storage based on the transmitted input requesting the hotness condition.

The hotness condition may include at least one of a capacity-based hotness condition or a time-based hotness condition, the capacity-based hotness condition may include a sum of write capacities of data blocks after a data block of a specific file is stored in the storage and before being deleted, and the time-based hotness condition may include a time at which the specific file written to the data block of the specific file is deleted.

The use attribute information of the file requested to be deleted may include a deletion time of the file requested to be deleted, obtained based on a time that the file requested to be deleted is generated in the storage and a time requested to be deleted, or write capacity of the file requested to be deleted in the storage.

The attribute of the extension may include a hot file and a cold file, and the information related to the extension may include at least one of an extension field, an average deletion time field indicating an average time deleted from the storage for each extension, an input sample number field indicating an access frequency for an input/output request for each extension, or an attribute field of the extension.

The configuring the attribute of the extension of the file requested to be deleted may include: counting and updating a number of times a request to delete the file is generated as a number of input samples; and based on the updated number of input samples exceeding a designated value, configuring the attribute of the extension of the file requested to be deleted, based on the updated information related to the extension and the hotness condition of the storage.

The method may further include: based on a request to write another file, identifying an attribute of an extension of the another file requested to be written; and tagging the attribute of the extension to the other file requested to be written, to transmit the other file to the storage.

An electronic device according to one or more embodiments of the disclosure may dynamically manage an attribute of the extension of a file requested to be deleted based on use attribute information of the file requested to be deleted and a hotness condition thereof, thereby storing a file having the attribute of the same extension in the same block of the storage. By storing the file having the attribute of the same extension in the same block of storage, a number of valid pages included in the block may decrease during garbage collection. As the number of valid pages included in the block decreases during garbage collection, an efficiency of the garbage collection may increase.

An electronic device according to one or more embodiments of the disclosure may store a file having the attribute of the same extension in the same block of the storage, so that it is possible to reduce the number of executions of garbage collection, thereby extending useful life of the storage.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
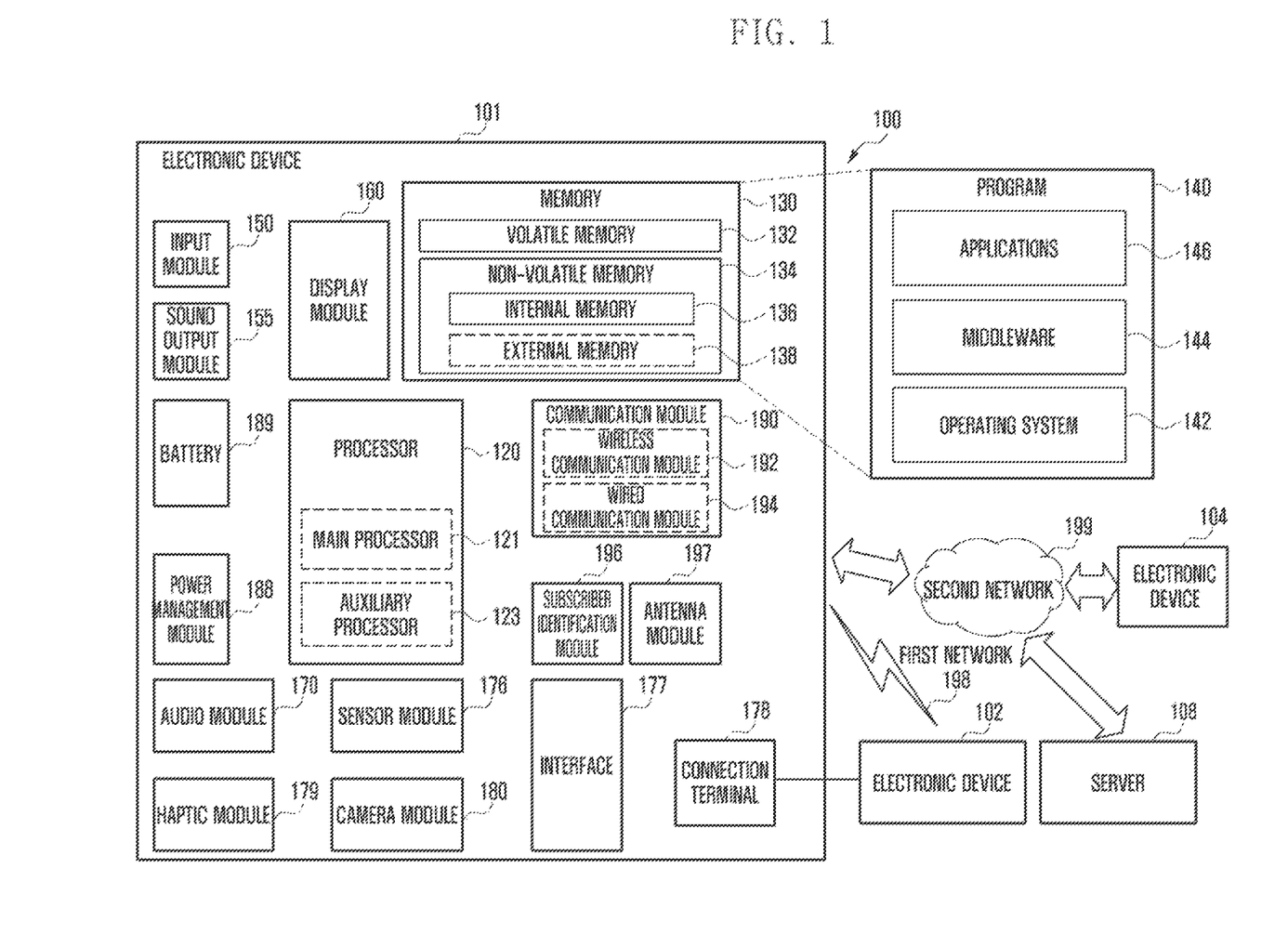
FIG. 1 is a block diagram illustrating an electronic device in a network environment according to one or more embodiments.

FIG. 1 is a block diagram illustrating an electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
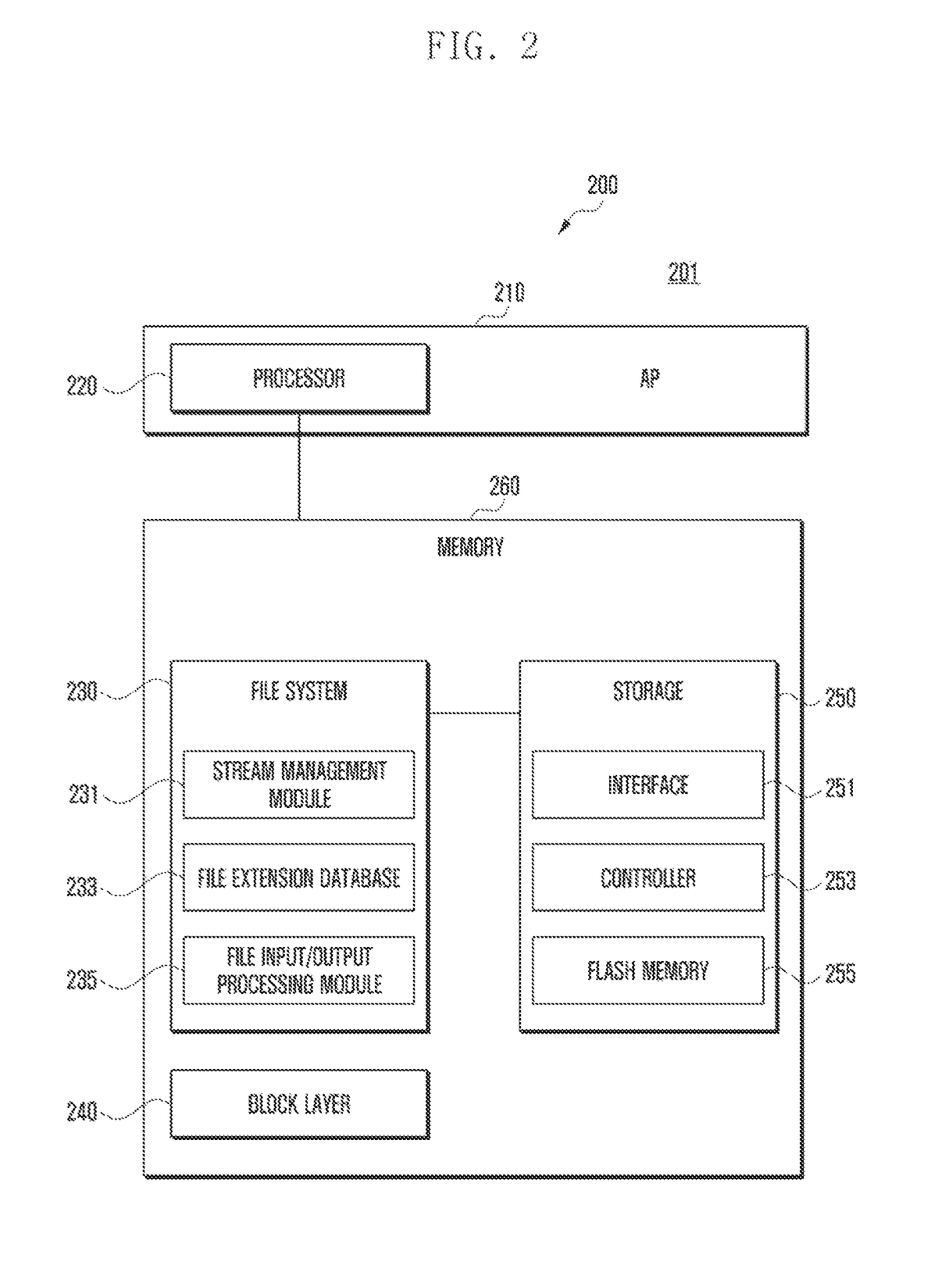
FIG. 2 is a block diagram illustrating an electronic device according to one or more embodiments.

FIG. 2 is a block diagram 200 illustrating an electronic device 201 according to one or more embodiments.

Referring to FIG. 2, the electronic device 201 (e.g., the electronic device 101 of FIG. 1) may include an Application Processor (AP) 210 and a memory 260. The electronic device 201 according to one or more embodiments may further include a communication circuit (e.g., the communication module 190 of FIG. 1) and/or a display (e.g., the display module 160 of FIG. 1).

According to one or more embodiments, the memory 260 may include a volatile memory (e.g., the volatile memory 132 of FIG. 1) and a storage 250 (e.g., the nonvolatile memory 134 of FIG. 1).

According to one or more embodiments, a component controlling the storage 250 through the AP 210 may be referred to as a host. According to one or more embodiments, the host may include an environment in which software including the AP 210 and an operating system (e.g., the operating system 142 of FIG. 1) operates. For example, the host may include a System on Chip (SoC) including the function of a chipset responsible for operation of various applications of the electronic device 201 and graphic processing.

According to one or more embodiments, the processor 220 may perform operations or data processing related to control and/or communication of each component of the electronic device 201. For example, the processor 220 may be operatively connected to the components of the electronic device 201.

According to one or more embodiments, the processor 220 may execute a variety of software (e.g., the program 140). The memory 260 may include a file system 230, a block layer 240, and a storage 250. For example, the file system 230 and the block layer 240 are program modules stored in the memory 260 and may be operated by the processor 220. For example, the file system 230 and the block layer 240 may be program modules stored in a nonvolatile memory (e.g., the nonvolatile memory 134 in FIG. 1), and/or the storage 250, and may be loaded into a volatile memory (e.g., the volatile memory 132 of FIG. 1) and operated by the processor 220 when the file system 230 and the block layer 240 are executed.

According to one or more embodiments, the processor 220 may store file-type data in the storage 250 through the file system 230. For example, the file system 230 may refer to a data structure managed by the processor 220 to store data in the storage 250. The electronic device 201 may utilize the file system 230 to efficiently write data to the storage 250 or read data stored in the storage 250. For example, the file system 230 may include File Allocation Table 16 (FAT16), File Allocation Table 32 (FAT32), New Technology File System (NTFS), Second Extended File System (ext2), ext3, ext4, Flash Friendly File System (F2FS), or reiserFS.

In one or more embodiments of the disclosure, description will be made assuming that the file system 230 is a F2FS. For example, the F2FS may refer to a file system optimized for a NAND flash memory (e.g., the flash memory 255) based on a log-based storage.

In one or more embodiments of the disclosure, the file system 230 may include a stream management module 231, a file extension database 233, and/or a file input/output processing module 235.

In an embodiment, the stream management module 231 may request a hotness condition from the storage 250 when mounting (e.g., activating) the file system 230. Upon receiving the hotness condition from the storage 250, the stream management module 231 may configure the file extension database 233 based on the received hotness condition. For example, the hotness condition may include a capacity-based hotness condition and/or a time-based hotness condition. For example, the capacity-based hotness condition may include a sum of write capacities of other data blocks performed after a data block of a specific file is stored in the storage 250 and before being deleted. The time-based hotness condition may include a time (e.g., 1 hour, 4 hours, or 1 day) at which the specific file written to the data block of the specific file is deleted.

In another embodiment, when the file extension database exists in the storage 250, the stream management module 231 may load the file extension database stored in the storage 250 into a volatile memory (e.g., the volatile memory 132 of FIG. 1) and may mount (e.g., activate) the file system 230.

According to one or more embodiments, the file extension database 233 may include an extension field, an average deletion time field indicating an average time deleted from the flash memory 255 of the storage 250 for each extension, an input sample number field indicating an access frequency for an input/output request for each extension, and/or an attribute field of the extension.

In an embodiment, the attribute of the extension may include a hot file and a cold file, but are not limited thereto. The attribute of the extension may include a none-file. For example, the none-file may include a file that does not belong to the hot file or the cold file.

According to one or more embodiments, as to an operation of determining attribute of the extension of a file based on a time-based hotness condition among hotness conditions, the hot file may include files that are invalidated by being deleted or overwritten from the flash memory 255 within a designated period of time (e.g., 1 hour, 4 hours, or 1 day). The cold file may include files that are not deleted or overwritten from the flash memory 255 at a time exceeding the designated time (e.g., 1 hour, 4 hours, or 1 day).

In an operation of determining attribute of the extension of the file based on the capacity-based hotness condition among the hotness conditions, after a specific file is stored, when the specific file is not deleted while additional write of a designated capacity (e.g., about 200 M Bytes) is performed in the storage 250, the stream management module 231 may configure the specific file as the cold file. After the specific file is stored, when the specific file is deleted while additional write of the designated capacity (e.g., about 200 M Bytes) is performed in the storage 250, the stream management module 231 may configure the specific file as the hot file.

In an embodiment, the file extension database 233 may be updated by the stream management module 231 when the file is deleted. In an embodiment, the stream management module 231 may identify use attribute information of the file requested to be deleted when the file is deleted. For example, the stream management module 231 may obtain a deletion time of the file based on a time when the file is generated (or changed) and a time when the file is deleted, and based on this (e.g., the deletion time of the file), may update information related to the extension of the file stored in the file extension database 233.

In an embodiment, the attribute of the extension in the file extension database 233 may be updated based on the updated information related to the extension and the hotness condition received from the storage 250. The stream management module 231 is not limited thereto, and the stream management module 231 may update the attribute of the extension based on the hotness condition for the capacity of the file requested to be deleted, stored in an arbitrary data block of the flash memory 255.

According to one or more embodiments, the file extension database 233 may be separately stored in preparation for power off.

According to one or more embodiments, the file input/output processing module 235 may process an input and an output of a file. For example, when a file input/output request (a request to input/output a file) is generated, the file input/output processing module 235 may provide attribute of the extension of the file using 'ioctl' (input/output control). The file input/output processing module 235 may call a hooking function registered by the stream management module 231 when the file input/output request, for example, a file delete request is generated.

When the file input/output request, for example, a file write request (a request to write a file) is generated, the file input/output processing module 235 may configure the attribute of the extension of the file with reference to the file extension database 233. For example, the file input/output processing module 235 may identify the attribute of the extension of the file requested to be written with reference to the file extension database 233, and may configure the attribute (e.g., a hot file or a cold file) of the extension of the file requested to be written based on the attribute configured in the extension. When the file write request is generated, the file input/output processing module 235 may make the file write request to the block layer 240 by tagging the attribute of the extension to the file requested to be written.

According to one or more embodiments, the block layer 240 may store data of a file in the storage 250 and may input and output data. The block layer 240 may transmit the attribute of the extension of the file tagged to the block input/output to the storage 250 during a block write processing.

According to one or more embodiments, the storage 250 may include an interface 251, a controller 253, and/or a flash memory 255. The storage 250 may store a variety of data used by at least one component (e.g., the processor 220) of the electronic device 201. For example, data may include input data or output data for software (e.g., the program 140) and commands related thereto.

In an embodiment, the storage 250 may receive the attribute of the extension of the file from the file system 230 when performing a file write operation, and may store data based on the received attribute. For example, the storage 250 may store files having the same attribute of the extension in the same erase block.

In an embodiment, the interface 251 may receive and process an input/output command to be executed in the storage 250 from the block layer 240. For example, in response to (based on) a reception of the file write request from the block layer 240, the interface 251 may process data of the file based on the attribute of the extension of the file. For example, when the storage 250 supports a Small Computer Systems Interface (SCSI), the interface 251 may designate the attribute of the extension of a file requested to be written as a hot file or a cold file using a separate command such as "WRITESTREAM" to transmit the designated result to the controller 253. For another example, the interface 251 may transmit the attribute of the extension to the controller 253 by using a group number defined in a "WRITE command" field.

In an embodiment, the controller 253 may drive a program that manages storage and access of the data of the file and in the flash memory 255. For example, the file requested to be written may be expressed as data in the flash memory 255. When the data is stored, the controller 253 may store data having the same attribute of the extension in the same erase block in the flash memory 255 with reference to the attribute of the extension. As the data having the same attribute of the extension is stored in the same erase block, garbage collection efficiency may be increased.

According to one or more embodiments, the flash memory 255 of the storage 250 may include a nonvolatile memory (e.g., the nonvolatile memory 134 of FIG. 1). The flash memory 255 may include a NAND flash memory that meets a Universal Flash Storage (UFS) standard.

In an embodiment, the flash memory 255 may include a plurality of flash chips. Each of the plurality of flash chips may include a plurality of erase blocks. When storing data, the storage 250 may initialize the data in units of an erase block and then write the erase block in units of pages.

According to one or more embodiments, the storage 250 may extract a logical address corresponding to a corresponding file based on a delete request received from the processor 220 (e.g., the block layer 240). The storage 250 may delete a physical page corresponding to the extracted logical address. In another embodiment, the flash memory 255 may store a mapping table representing a relationship (a mapping relationship) between a logical address and a physical address for the stored data. For example, the mapping table may refer to a mapping table (a logical to physical address mapping information, L2P table) that maps the logical address and the physical address of the flash memory 255 to each other. The storage 250 may delete data of the logical address and the physical address extracted from the mapping table.

According to one or more embodiments, the stream management module 231, the file extension database 233, the file input/output processing module 235, and/or the block layer 240 may be stored in the storage 250. For example, the stream management module 231, the file input/output processing module 235, and/or the block layer 240 may be stored in the flash memory 255 and may be loaded, when executed, into the memory 260 (e.g., the volatile memory 132 of FIG. 1) to be executed by the processor 220.

Figure 3:
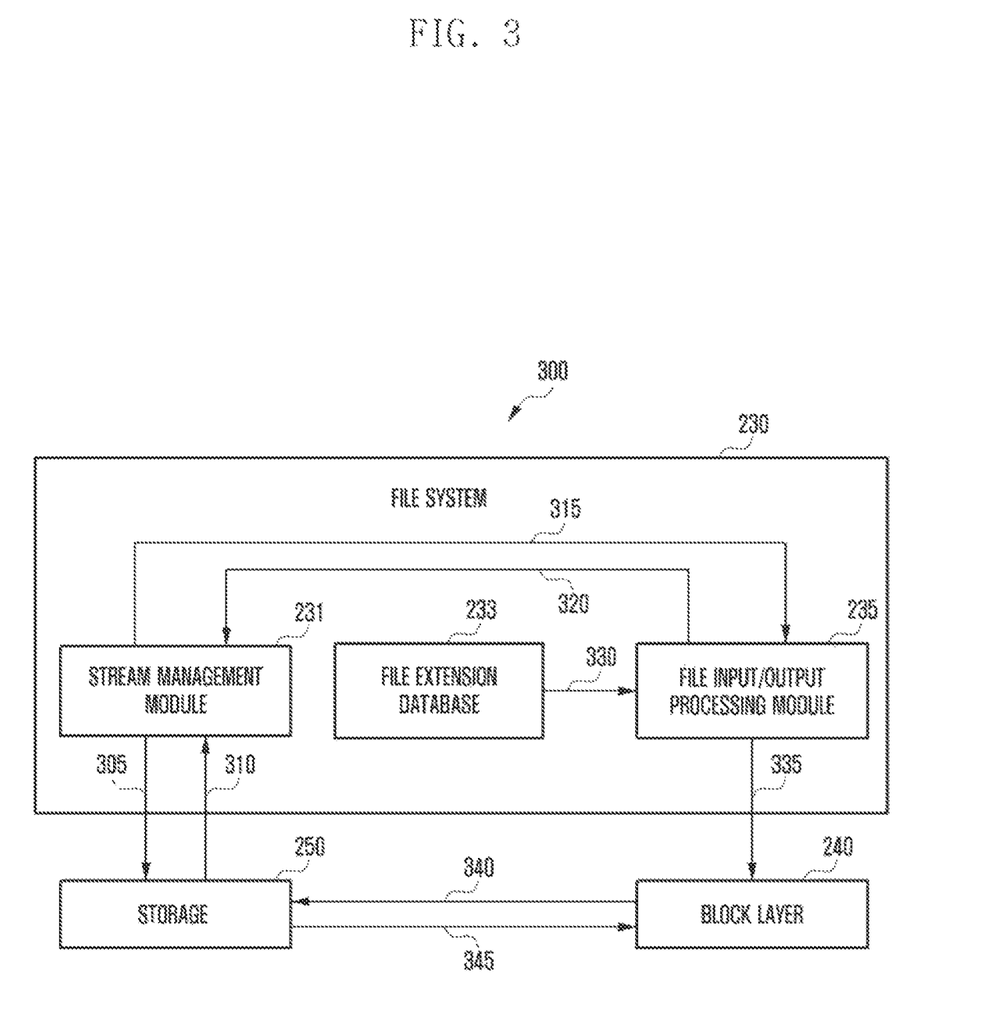
FIG. 3 is a block diagram illustrating signal flows among a file system, a block layer, and a storage according to one or more embodiments.

FIG. 3 is a block diagram 300 illustrating signal flows among the file system 230, the block layer 240, and the storage 250 according to one or more embodiments.

Referring to FIG. 3, the stream management module 231 may request, in 305, a hotness condition from the storage 250. The storage 250 may transmit, in 310, the hotness condition to the stream management module 231. For example, the hotness condition may be configured based on the attribute of the storage 250 (e.g., the number of erase blocks and the size of the erase block). The hotness condition may include a condition for determining attribute of the extension of an input/output requested file as a hot file or a cold file.

In an embodiment, when a file input/output request (e.g., a write/delete request) is generated, the file input/output processing module 235 may transmit, in 320, information related to the file input/output request to the stream management module 231. The file input/output processing module 235 may receive, in 315, a response signal from the stream management module 231 in response to transmitting, in 320, information related to the file input/output request to the stream management module 231.

In an embodiment, when a file write request is generated, the file input/output processing module 235 may identify attribute of the extension of the file with reference to, in 330, the file extension database 233. The attribute of the extension may include a hot file and a cold file.

In an embodiment, the file input/output processing module 235 may tag the attribute of the extension to the file requested to be written to make a file write request 335 to the block layer 240.

In an embodiment, the block layer 240 may transmit, in 340, the attribute of the extension of the file tagged to the block input/output to the storage 250 during block write processing. The block layer 240 may receive, in 345, a response signal from the storage 250 in response to transmitting, in 340, the attribute of the extension of the file tagged to the block input/output to the storage 250.

In an embodiment, the storage 250 may perform a write operation of the file to the flash memory (e.g., the flash memory 255 of FIG. 2) based on the attribute of the extension received from the block layer 240. For example, the storage 250 may store files having the same attribute of the extension in the same erase block.

In an embodiment, when a file delete request is generated, the stream management module 231 may obtain a deletion time of the file requested to be deleted based on a time when the file requested to be deleted is generated in the storage 250 and a time requested to be deleted, and based on this, may update information related to the extension of the file requested to be deleted, stored in the file extension database 233.

Figure 4:
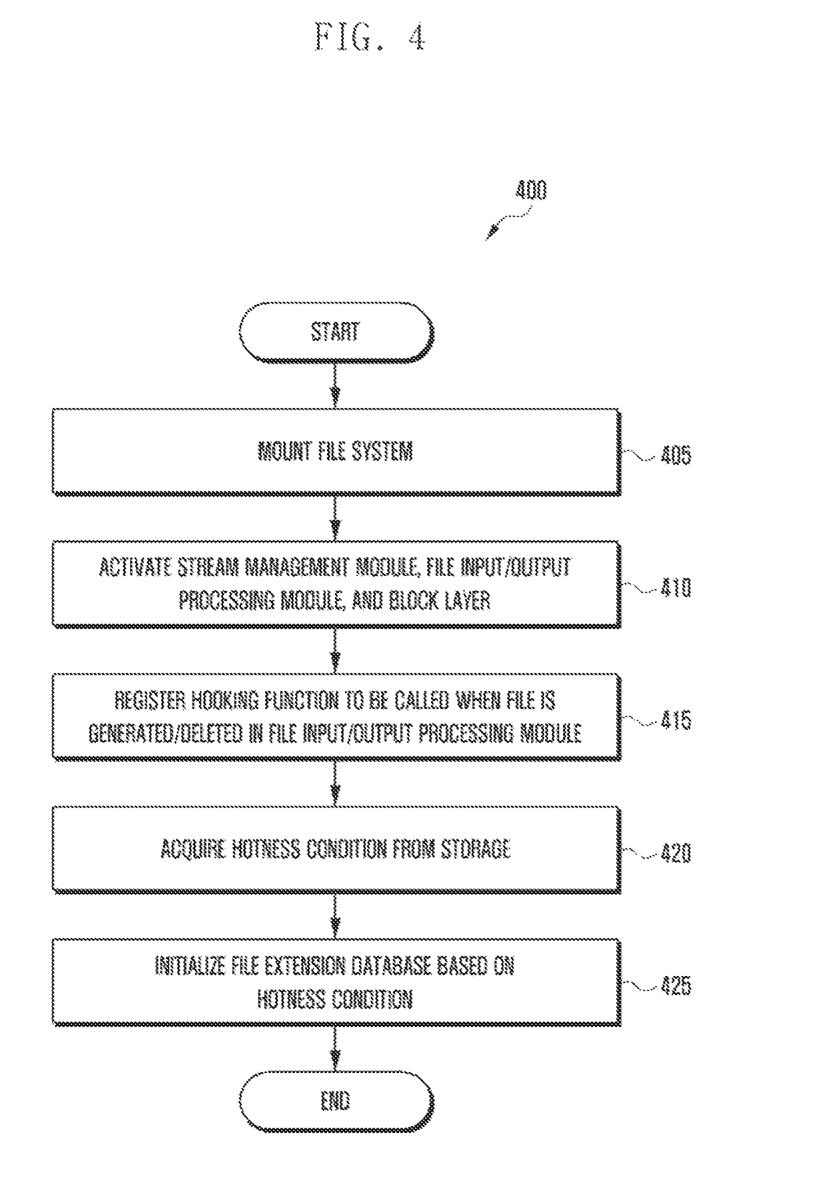
FIG. 4 is a flowchart illustrating a method of configuring a hotness condition by activating a file system according to one or more embodiments.

FIG. 4 is a flowchart 400 illustrating a method of configuring a hotness condition by activating the file system 230 according to one or more embodiments.

Referring to FIG. 4, in operation 405, a processor (e.g., the processor 220 of FIG. 2) may mount (e.g., activate) the file system 230.

In an embodiment, in operation 410, the processor 220 may activate a stream management module (e.g., the stream management module 231 of FIG. 2), a file input/output processing module (e.g., the file input/output processing module 235 of FIG. 2), and a block layer (e.g., block layer 240 of FIG. 2).

In an embodiment, in operation 415, the processor 220 (e.g., the stream management module 231) may register a hooking function to be called when a file is generated/deleted in the file input/output processing module 235. For example, by registering the hooking function to be called when the file is generated/deleted, the processor 220 (e.g., the stream management module 231) may receive information on generation/deletion of a file with an extension from the file input/output processing module 235.

In an embodiment, in operation 420, the processor 220 may acquire a hotness condition from the storage 250. For example, the processor 220 may request a hotness condition from the storage 250, and in response to the request, may receive the hotness condition from the storage 250. For example, the hotness condition is a reference value for determining the attribute of the extension of the file, and may include, for example, a capacity-based hotness condition and/or a time-based hotness condition. The capacity-based hotness condition may include the sum of write capacities of other data blocks performed after a data block of a specific file is stored in the storage 250 and before being deleted. The time-based hotness condition may include a time at which the specific file written to the data block of the specific file is deleted.

In an embodiment, in operation 425, the processor 220 may initialize a file extension database (e.g., the file extension database 233 of FIG. 2) based on the hotness condition. For example, the file extension database 233 may include an extension field, an average deletion time field indicating an average time deleted from the flash memory 255 of the storage 250 for each extension, an input sample number field indicating an access frequency for an input/output request for each extension, and/or an attribute field of the extension. The hotness condition may be used to determine the attribute (e.g., a hot file or a cold file) of the extension stored in the file extension database 233.

In one or more embodiments, in a case in which the file system 230 is mounted, when the hotness condition is not acquired from the storage 250, the processor 220 may initialize the file extension database 233 based on a predetermined hotness condition. The processor 220 may classify the attribute of the extension of the file into the hot file or the cold file based on the predetermined hotness condition.

In one or more embodiments, when there is the file extension database stored in the storage 250, the file extension database may be loaded into a volatile memory (e.g., the volatile memory 132 of FIG. 1) of a host terminal managed by the processor 220. Then, the processor 220 may initialize the file extension database 233.

Figure 5:
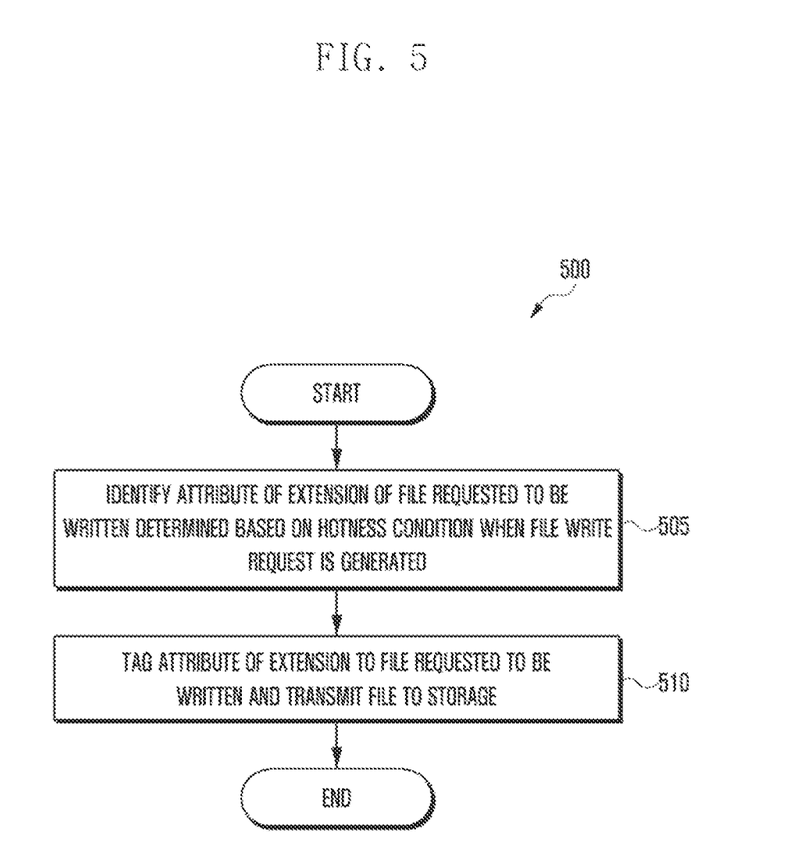
FIG. 5 is a flowchart illustrating a method of transmitting a file write request (a request to write a file) to a storage when the file write request is generated according to one or more embodiments.

FIG. 5 is a flowchart 500 illustrating a method of transmitting a file write request to a storage when the file write request is generated according to one or more embodiments.

Referring to FIG. 5, when a file write request is generated, in operation 505, a processor (e.g., the processor 220 of FIG. 2) (e.g., the file input/output processing module 235 of FIG. 2) may identify an attribute of the extension of a file requested to be written determined based on a hotness condition. For example, the processor 220 may identify the attribute of the extension of the file with reference to a file extension database (e.g., the file extension database 233 of FIG. 2). The attribute of the extension may include a hot file and a cold file.

In an embodiment, in operation 510, the processor 220 (e.g., the block layer 240) may tag the attribute of the extension to the file requested to be written to transmit the tagged result to a storage (e.g., the storage 250 of FIG. 2). For example, the processor 220 (e.g., the file input/output processing module 235) may identify the attribute of the extension of the file with reference to the file extension database 233 when a block input/output is generated. The file input/output processing module 235 may tag the identified attribute of the extension to the file requested to be written and may transmit the tagged result to the block layer 240. For example, when the attribute of the extension of the file requested to be written is the cold file, the file input/output processing module 235 may tag the cold file to the file requested to be written with reference to the file extension database 233, and may transmit the tagged result to a storage (e.g., the storage 250 of FIG. 2). The block layer 240 may transmit the attribute of the extension of the file tagged to the block input/output to the storage 250 during block write processing.

In an embodiment, the storage 250 may perform a write operation of the file on a flash memory (e.g., the flash memory 255 of FIG. 2) based on the attribute of the extension received from the block layer 240. For example, the storage 250 may store a file having the same attribute of the extension in the same erase block. As the file having the same attribute of the extension is stored in the same erase block, the number of valid pages included in the erase block may decrease during garbage collection. As the number of valid pages included in the erase block decreases during garbage collection, the efficiency of the garbage collection may increase.

Figure 6:
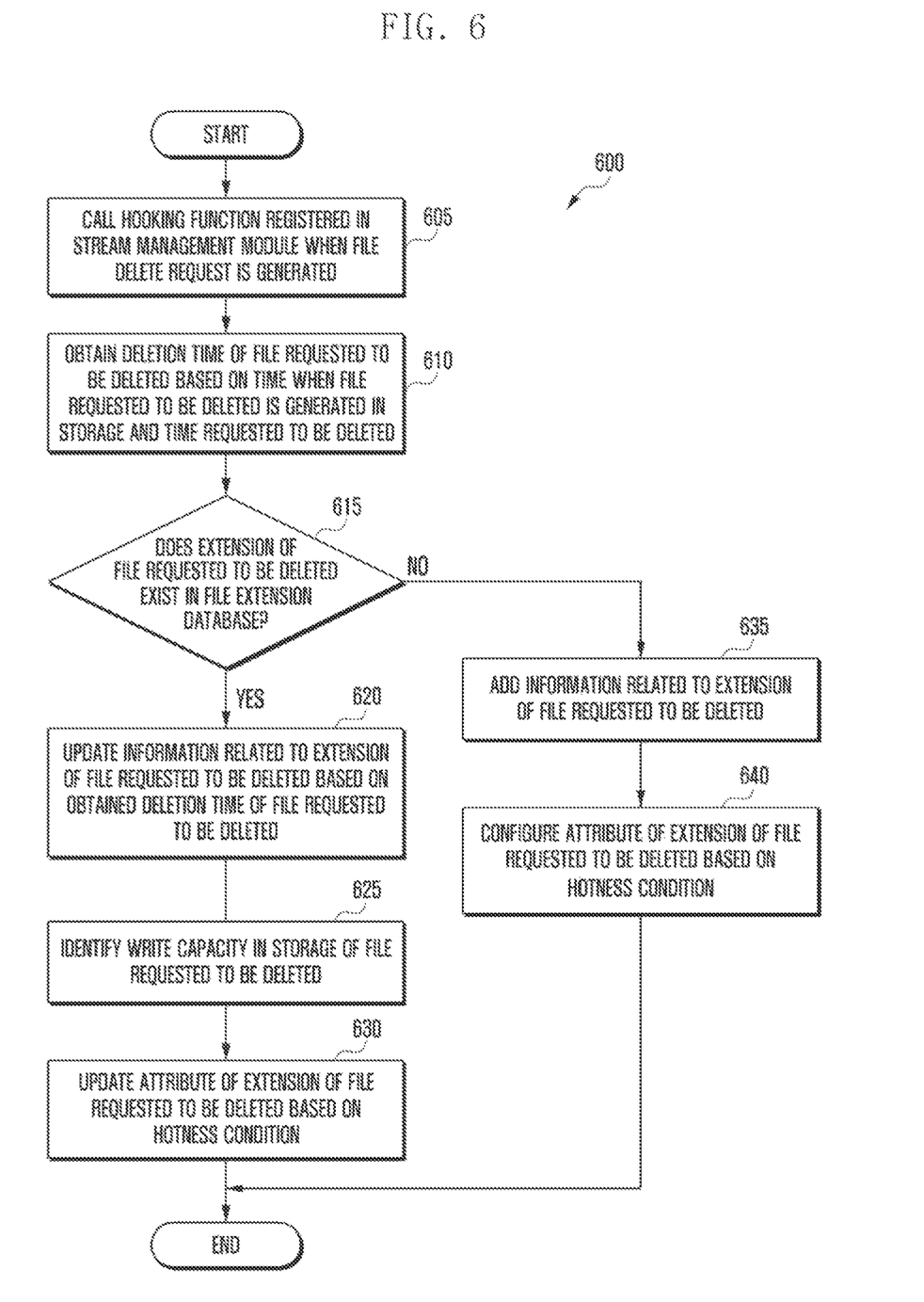
FIG. 6 is a flowchart illustrating a method of updating a file extension database according to one or more embodiments.

FIG. 6 is a flowchart 600 illustrating a method of updating the file extension database 233 according to one or more embodiments.

Referring to FIG. 6, when a file delete request (a request to delete a file) is generated, in operation 605, a processor (e.g., the processor 220 of FIG. 2) may call a hooking function registered by a stream management module (e.g., the stream management module 231 of FIG. 2). For example, as the file delete request is generated, the processor 220 may receive information on deletion of a file with an extension from a file input/output processing module (e.g., the file input/output processing module 235 of FIG. 2).

In an embodiment, in operation 610, the processor 220 (e.g., the stream management module 231) may obtain a deletion time of a file requested to be deleted based on a time when the file requested to be deleted is generated in a storage (e.g., the storage 250 of FIG. 2) and a time requested to be deleted. For example, the processor 220 (e.g., the stream management module 231) may compare the generation time of the file (or modification {change} time) with the time of the file requested to be deleted, and based on this, may obtain the deletion time of the file.

In an embodiment, in operation 615, the processor 220 may determine whether the extension of the file requested to be deleted exists in a file extension database (e.g., the file extension database 233 of FIG. 2). When the extension of the file requested to be deleted exists in the file extension database 233 (e.g., YES in operation 615), in operation 620, the processor 220 may update information related to the extension of the file requested to be deleted based on the obtained deletion time of the file requested to be deleted.

In an embodiment, the file extension database 233 may include an extension field, an average deletion time field indicating an average time deleted from the flash memory 255 of the storage 250 for each extension, an input sample number field indicating an access frequency for an input/output request for each extension, and/or an attribute field of the extension.

In an embodiment, when the extension of the file requested to be deleted exists in the file extension database 233, in operation 610, the processor 220 (e.g., the stream management module 231) may update the information related to the extension of the file requested to be deleted, stored in the file extension database 233 based on the obtained deletion time of the file requested to be deleted. For example, the information related to the extension of the file requested to be deleted may be stored previously, and the processor 220 (e.g., the stream management module 231) may update the previously stored information related to the extension based on the deletion time of the file requested to be deleted. For example, the processor 220 (e.g., the stream management module 231) may update an average deletion time field and/or an input sample number field of the corresponding extension in the file extension database 233.

In an embodiment, in operation 625, the processor 220 (e.g., the stream management module 231) may identify the write capacity of the storage 250 of the file requested to be deleted. For example, the processor 220 (e.g., the stream management module 231) may identify the sum of write capacities of the data block performed after the file is stored in an arbitrary data block and before being deleted.

In an embodiment, in operation 630, the processor 220 may update the attribute of the extension of the file requested to be deleted based on a hotness condition. For example, the processor 220 may determine the attribute of the extension based on the average deletion time and hotness condition of the file. The attribute of the extension stored in the file extension database 233 may be predetermined, and the predetermined attribute of the extension may be maintained based on the determined attribute of the extension, or may be changed to the determined attribute of the extension.

In an embodiment, the hotness condition may include a capacity-based hotness condition and/or a time-based hotness condition. For example, the capacity-based hotness condition may include the sum of write capacities of other data blocks performed after a data block of a specific file is stored in the storage 250 and before being deleted. The time-based hotness condition may include a time when the specific file written to the data block of the specific file is deleted.

In an embodiment, the processor 220 may update the attribute of the extension of the file in the above-described operation 630 based on the input sample number field in the file extension database 233. For example, in order to increase the accuracy of determining the attribute of the extension, when the number of input samples exceeds a designated number of times, the processor 220 may perform the above-described operation 630.

In an embodiment, when the extension of the file requested to be deleted does not exist in the file extension database 233 (e.g., NO in operation 615), in operation 635, the processor 220 may add information related to the extension of the file requested to be deleted. For example, the processor 220 may generate the information related to the extension to include the extension, the deletion time of the file having the extension, the number of input samples, and/or attribute of the extension.

In an embodiment, in operation 640, the processor 220 may configure the attribute of the extension of the file requested to be deleted based on the hotness condition.

Figure 7:
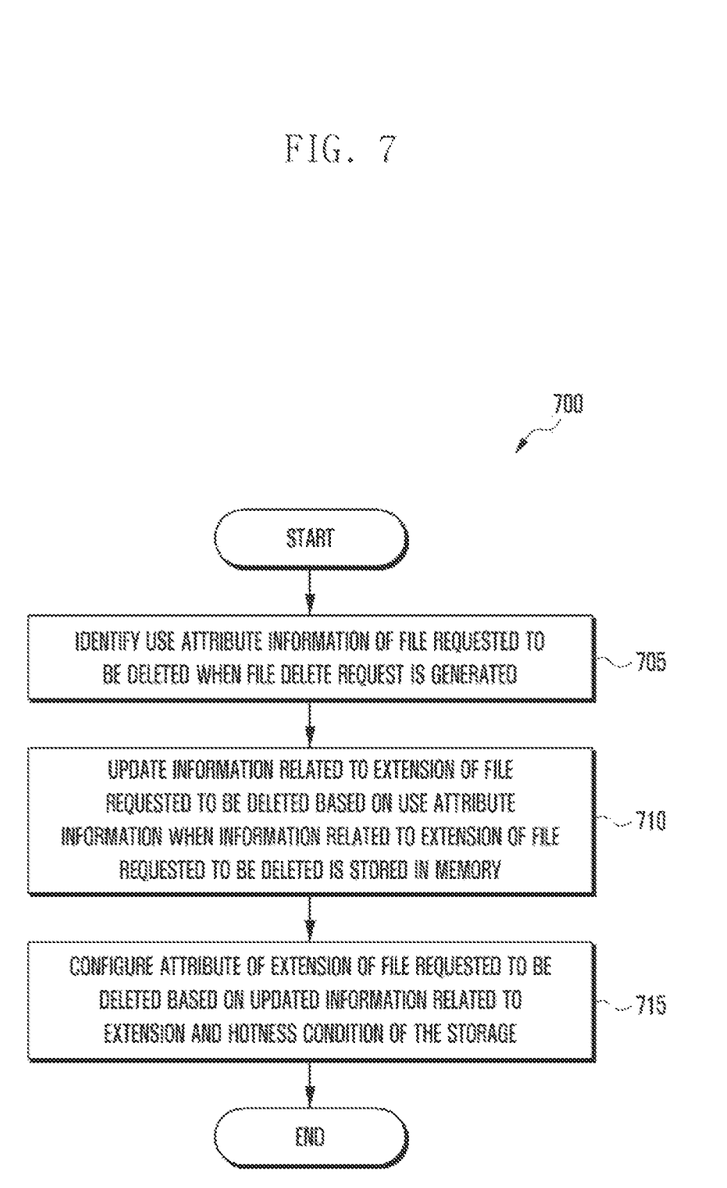
FIG. 7 is a flowchart illustrating a storage management method according to one or more embodiments.

FIG. 7 is a flowchart 700 illustrating a storage management method according to one or more embodiments.

Referring to FIG. 7, when a file delete request is generated, in operation 705, a processor (the processor 220 of FIG. 2) may identify use attribute information of a file requested to be deleted. For example, the use attribute information of the file requested to be deleted may include a deletion time of the file requested to be deleted, obtained based on a time when the file requested to be deleted is generated in a storage (e.g., the storage 250 of FIG. 2) and a time requested to be deleted, and/or write capacity of the file requested to be deleted within the storage 250.

In an embodiment, in operation 710, when information related to the extension of the file requested to be deleted is stored in a memory (e.g., the volatile memory 132 of FIG. 1), the processor 220 may update the information related to the extension of the file requested to be deleted based on the use attribute information.

In an embodiment, the processor 220 may update the information related to the extension of the file requested to be deleted, stored in a file extension database (e.g., the file extension database 233 of FIG. 2). The file extension database 233 may include an extension field, an average deletion time field indicating an average time deleted from the flash memory 255 of the storage 250 for each extension, an input sample number field indicating an access frequency for an input/output request for each extension, and/or an attribute field of the extension. The processor 220 (e.g., the stream management module 231) may update the average deletion time field and/or input sample number field of the corresponding extension within the file extension database 233.

In an embodiment, in operation 715, the processor 220 may configure the attribute of the extension of the file requested to be deleted based on the updated information related to the extension and a hotness condition of the storage (e.g., the storage 250 of FIG. 2). For example, the hotness condition may include a capacity-based hotness condition and/or a time-based hotness condition. Based on whether the updated information related to the extension satisfies the hotness condition, the attribute (e.g., a hot file or a cold file) of the extension of the file requested to be deleted may be updated.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a memory comprising a storage; and
   a processor operatively connected to the memory,
   wherein the processor is configured to:
      based on a request to delete a file, identify use attribute information about the file requested to be deleted;
      based on information related to an extension of the file requested to be deleted, the information being stored in the memory, update the information related to the extension of the file requested to be deleted, based on the use attribute information; and
      configure an attribute of the extension of the file requested to be deleted, based on the updated information related to the extension of the file requested to be deleted and a hotness condition of the storage,
   wherein the use attribute information of the file requested to be deleted comprises at least one of:
      a deletion time of the file requested to be deleted, wherein the deletion time is obtained based on a time that the file requested to be deleted is generated in the storage and a time requested to be deleted, or
      write capacity of the file requested to be deleted in the storage, and
   wherein the extension of the file represents at least one type of the file,
   wherein the attribute of the extension comprises a hot file and a cold file,
   wherein the hot file corresponds to a file invalidated by being deleted or overwritten from the memory within a designated time, and
   wherein the cold file corresponds to a file that is not deleted or overwritten from the memory at a time exceeding the designated time.

2. The electronic device of claim 1, wherein the processor is further configured to receive the hotness condition from the storage based on an input requesting the hotness condition transmitted to the storage.

3. The electronic device of claim 1, wherein the hotness condition comprises at least one of a capacity-based hotness condition or a time-based hotness condition.

4. The electronic device of claim 3, wherein the capacity-based hotness condition comprises a sum of write capacities of data blocks after a data block of a specific file is stored in the storage and before being deleted, and
   wherein the time-based hotness condition comprises a time at which the specific file written to the data block of the specific file is deleted.

5. The electronic device of claim 1, wherein the processor is further configured to store another file having the same attribute of the extension in a same block of the storage based on the attribute of the extension.

6. The electronic device of claim 1, wherein the information related to the extension is stored as a database, and
wherein the information related to the extension comprises at least one of an extension field, an average deletion time field indicating an average time deleted from the storage for each extension, an input sample number field indicating an access frequency for an input/output request for each extension, or an attribute field of the extension.

7. The electronic device of claim 6, wherein the processor is further configured to:
count and update a number of times by which a request to delete the file is generated as a number of input samples; and
based on the updated number of input samples exceeding a designated value, configure the attribute of the extension of the file requested to be deleted, based on the updated information related to the extension and the hotness condition of the storage.

8. The electronic device of claim 1, wherein the processor is further configured to, based on a request to write another file, identify an attribute of the extension of the other file requested to be written, and tag the attribute of the extension to the other file requested to be written to transmit the other file to the storage.

9. A method for storage management of an electronic device comprising a memory that comprises a storage, the method comprising:
based on a request to delete a file, identifying use attribute information about the file requested to be deleted;
based on information related to an extension of the file requested to be deleted, the information being stored in the memory, updating the information related to the extension of the file requested to be deleted, based on the use attribute information; and
configuring an attribute of the extension of the file requested to be deleted, based on the updated information related to the extension and a hotness condition of the storage,
wherein the use attribute information of the file requested to be deleted comprises at least one of:
a deletion time of the file requested to be deleted, wherein the deletion time is obtained based on a time that the file requested to be deleted is generated in the storage and a time requested to be deleted, or
write capacity of the file requested to be deleted in the storage, and
wherein the extension of the file represents at least one type of the file,
wherein the attribute of the extension comprises a hot file and a cold file,
wherein the hot file corresponds to a file invalidated by being deleted or overwritten from the memory within a designated time, and
wherein the cold file corresponds to a file that is not deleted or overwritten from the memory at a time exceeding the designated time.

10. The method of claim 9, further comprising:
transmitting an input requesting the hotness condition to the storage; and
receiving the hotness condition from the storage based on the transmitted input requesting the hotness condition.

11. The method of claim 9, wherein the hotness condition comprises at least one of a capacity-based hotness condition or a time-based hotness condition.

12. The method of claim 11, wherein the capacity-based hotness condition comprises a sum of write capacities of data blocks after a data block of a specific file is stored in the storage and before being deleted.

13. The method of claim 12, wherein the time-based hotness condition comprises a time at which the specific file written to the data block of the specific file is deleted.

14. The method of claim 9, wherein the information related to the extension comprises at least one of an extension field, an average deletion time field indicating an average time deleted from the storage for each extension, an input sample number field indicating an access frequency for an input/output request for each extension, or an attribute field of the extension.

15. The method of claim 9, wherein the configuring the attribute of the extension of the file requested to be deleted comprises:
counting and updating a number of times a request to delete the file is generated as a number of input samples; and
based on the updated number of input samples exceeding a designated value, configuring the attribute of the extension of the file requested to be deleted, based on the updated information related to the extension and the hotness condition of the storage.

16. The method of claim 9, further comprising:
based on a request to write another file, identifying an attribute of an extension of the another file requested to be written; and
tagging the attribute of the extension to the other file requested to be written, to transmit the other file to the storage.

\* \* \* \* \*